United States Patent
Chen et al.

(10) Patent No.: US 8,265,419 B2
(45) Date of Patent: Sep. 11, 2012

(54) IMAGE PROCESSING APPARATUS AND IMAGE PROCESSING METHOD

(75) Inventors: Mei-Ju Chen, Hsinchu Hsien (TW); Jen-Shi Wu, Hsinchu Hsien (TW)

(73) Assignee: MStar Semiconductor, Inc. (TW)

( * ) Notice: Subject to any disclaimer, the term of this patent is extended or adjusted under 35 U.S.C. 154(b) by 281 days.

(21) Appl. No.: 12/765,494

(22) Filed: Apr. 22, 2010

(65) Prior Publication Data

US 2010/0272372 A1  Oct. 28, 2010

(30) Foreign Application Priority Data

Apr. 28, 2009 (TW) ................................ 98114010 A (51) Int. Cl.
*G06K 9/40* (2006.01)
*G06K 9/36* (2006.01)

(52) U.S. Cl. ........................ 382/274; 382/233

(58) Field of Classification Search ................. 382/233, 382/254, 266, 274, 275; 348/533, 607, 671
See application file for complete search history.

(56) References Cited

U.S. PATENT DOCUMENTS

| 7,889,250 B2 * | 2/2011 | Aragaki | 348/254 |
| 2008/0101717 A1 * | 5/2008 | Ho | 382/266 |

* cited by examiner

*Primary Examiner* — Yon Couso (74) *Attorney, Agent, or Firm* — Han IP Law PLLC; Andy M. Han (57) ABSTRACT

An image processing apparatus includes an edge keeping index (EKI) generating unit and a noise reducing unit. The image decoding unit decodes a data stream to generate a plurality of image comprising at least a current image having the target pixel. The adjusting unit, coupled to the image decoding unit, comprises an edge keeping index (EKI) generating unit, for generating an edge intensity value of the target pixel according to an original luminance value of the target pixel and an original luminance value of at least one neighboring pixel associated with the target pixel, and a noise reducing unit, coupled to the EKI generating unit, for determining a first adjusted luminance value of the target pixel according to the original luminance value of the target pixel and the original luminance value of the at least one neighboring pixel associated with the target pixel, and for generating a static adjusted luminance value of the target pixel according to the original luminance value, the first adjusted luminance value and a first adjustment value of the target pixel. The adjustment value is determined by the edge intensity value.

17 Claims, 10 Drawing Sheets

IMAGE PROCESSING APPARATUS AND IMAGE PROCESSING METHOD

CROSS REFERENCE TO RELATED PATENT APPLICATIONS

This patent application claims priority from Taiwan Patent Application No. 098114010, filed in the Taiwan Patent Office on Apr. 28, 2009, and incorporates the Taiwan patent application in its entirety by reference.

TECHNICAL FIELD

The present disclosure relates to an image processing apparatus, and more particularly, to an image processing apparatus and image processing method capable of determining a noise processing level according to an edge keeping index (EKI) of the image.

BACKGROUND OF THE PRESENT DISCLOSURE

In a common television (TV) system, noise processing is performed on an image data (e.g., a frame or a field) to adjust a luminance value of the image data, and the adjusted image data is further processed and displayed on a TV display. However, during the noise processing, a same noise processing approach is applied on each pixel of the image data; that is, regardless of complexity on details of various blocks, e.g., blocks with complicated details (such as lawns or leaves) or blocks with simple details (such as the sky or the skin of a person) in the image, the same noise processing level is used. Accordingly, when high-level noise processing is used, the area having complicated details is excessively processed such that image details become too obscure to be displayed. When low-level noise processing is used, the noise processing may be unsatisfactory for blocks with simple details, such that noise is not effectively restrained to undesirably affect image quality.

SUMMARY OF THE PRESENT DISCLOSURE

Therefore, one object of the present disclosure is to provide an image processing apparatus and an image processing method capable of determining a noise processing level according to an EKI of the image to solve the foregoing problem.

According to an embodiment of the present disclosure, an image processing apparatus comprises an image decoding unit and an image adjusting unit. The image decoding unit decodes a data stream to generate a plurality of image comprising at least a current image having the target pixel. The adjusting unit, coupled to the image decoding unit, comprises an edge keeping index (EKI) generating unit, for generating an edge intensity value of the target pixel according to an original luminance value of the target pixel and an original luminance value of at least one neighboring pixel associated with the target pixel, and a noise reducing unit, coupled to the EKI generating unit, for determining a first adjusted luminance value of the target pixel according to the original luminance value of the target pixel and the original luminance value of the at least one neighboring pixel associated with the target pixel, and for generating a static adjusted luminance value of the target pixel according to the original luminance value, the first adjusted luminance value and a first adjustment value of the target pixel. The adjustment value is determined by the edge intensity value.

According to another embodiment of the present disclosure, an image processing method comprises decoding a data stream to generate a plurality of image comprising at least one current image having the target pixel; determining an edge intensity value of the target pixel according to an original luminance value of a target pixel and an original luminance value of at least one neighboring pixel associated with the target pixel; generating a first adjusted luminance value of the target pixel according to the original luminance value of the target pixel and the original luminance value of the at least one neighboring pixel associated with the target pixel at the current image; and determining a static adjusted luminance value of the target pixel according to the original luminance value, the first adjusted luminance value and a first adjustment value; wherein the first adjustment value is determined by the edge intensity value.

According to another embodiment of the present disclosure, an image processing apparatus comprises an image decoding unit and an image adjusting unit. The image decoding unit, for decoding a data stream to generate a plurality of image comprising a current image having the target pixel and a previous image having a corresponding pixel mapping to the target pixel. The image adjusting unit, coupled to the image decoding unit, comprises an EKI generating unit, for generating an original EKI, a first EKI and a dynamic noise-reduced EKI of the corresponding pixel according to an original luminance value, a first adjustment value and a dynamic adjusted luminance value of the corresponding pixel, and a noise reducing unit, coupled to the EKI generating unit, for determining a first adjusted luminance value of the target pixel according to an original luminance value of a target pixel and an original luminance value of at least one neighboring pixel associated with the target pixel, and for generating a dynamic adjusted luminance value of the target pixel according to the original luminance value, the first adjusted luminance value and an adjustment value of the target pixel. The adjustment value of the target pixel is obtained by adjusting an adjustment value of the corresponding pixel according to a parameter determined according to the original EKI, the first EKI and the dynamic noise-reduced EKI of the corresponding pixel.

According to an image processing apparatus and an image processing method in accordance with embodiments of the present disclosure, a noise processing level for processing a pixel data of an image data is determined according to an EKI. Accordingly, noise processing with a proper level is performed on the pixel data of the image to improve image quality.

DETAILED DESCRIPTION OF THE PREFERRED EMBODIMENT

Figure 1:
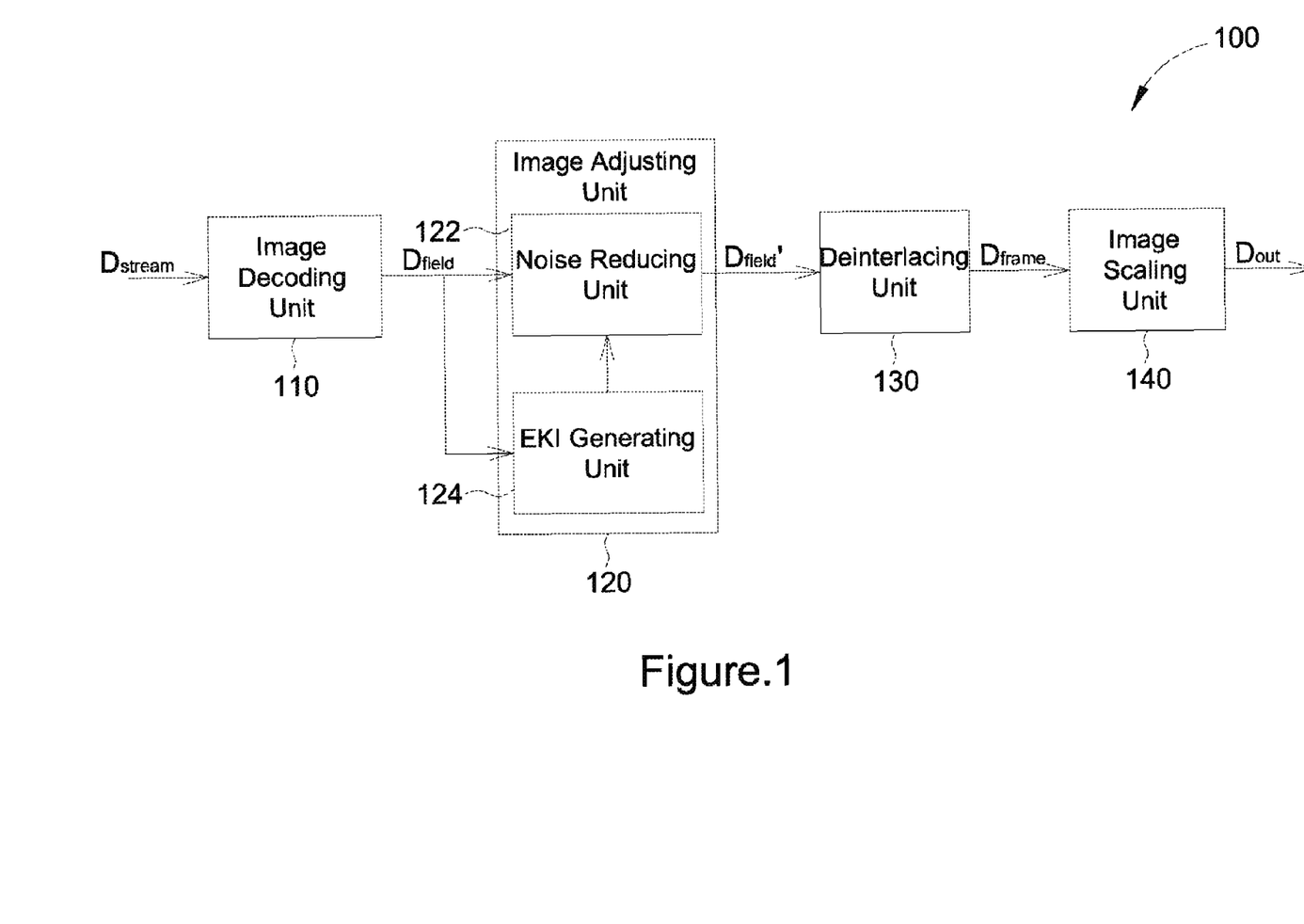
FIG. 1 is a schematic diagram of an image processing apparatus in accordance with a first embodiment of the present disclosure.

Refer to FIG. 1 showing an image processing apparatus 100 in accordance with a first embodiment of the present disclosure. The image processing apparatus comprises an image decoding unit 110, an image adjusting unit 120, a de-interlacing unit 130 and an image scaling unit 140. The image adjusting unit 120 comprises a noise reducing unit 122 and an edge keeping index (EKI) generating unit 124. In addition, the image processing apparatus 100 is implemented via a hardware or software approach.

Figure 2:
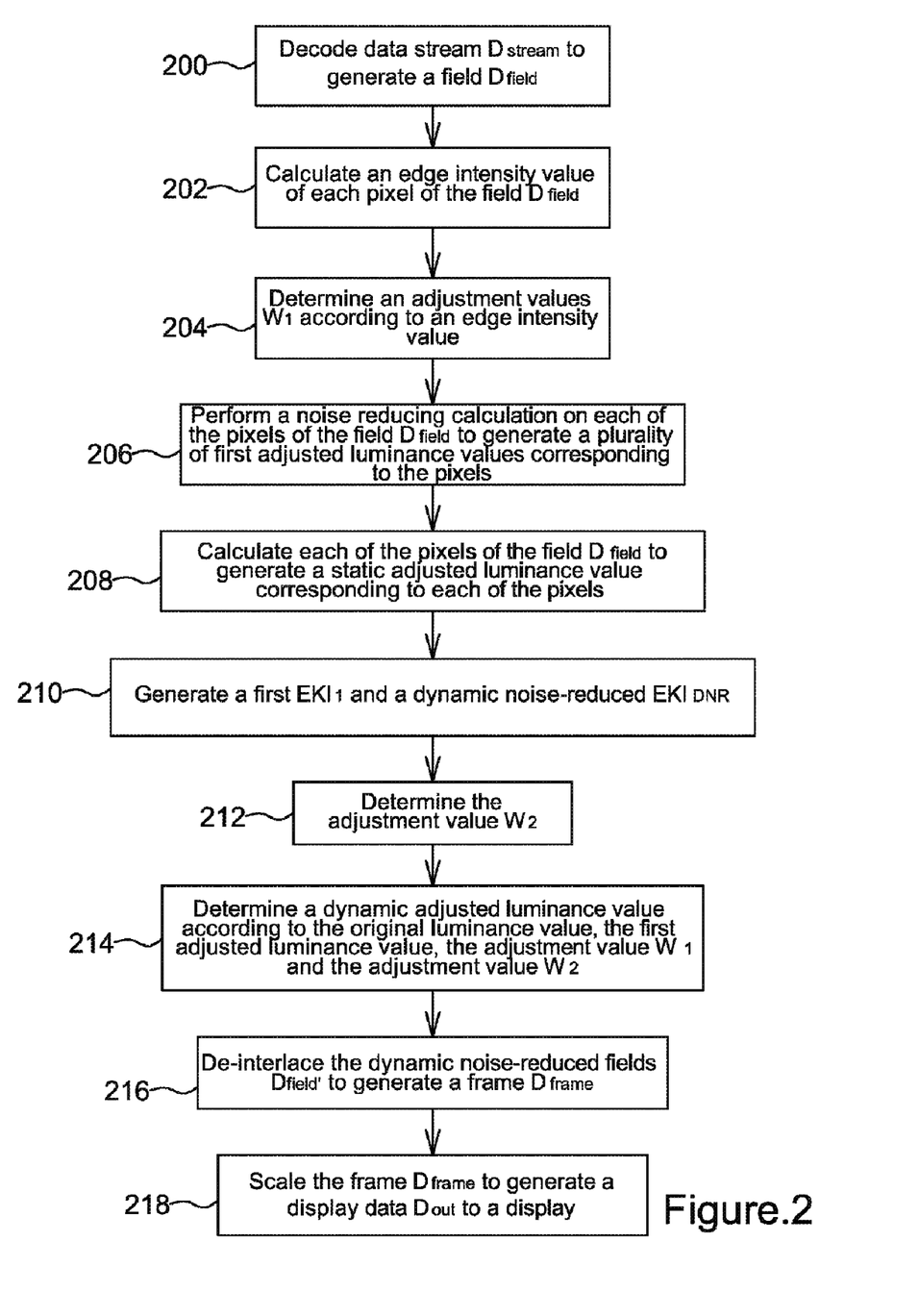
FIG. 2 is a flowchart of processing a data stream by the image processing apparatus illustrated in FIG. 1.

Referring to FIG. 1 and FIG. 2, FIG. 2 is a flowchart of processing a data stream $D_{stream}$ by the image processing apparatus 100. Note that, the steps in the flowchart need not be performed as the sequence shown in FIG. 2 nor be successive, provided that the same result is substantially achieved. In Step 200, the image decoding unit 110 decodes the data stream $D_{stream}$ to generate a plurality of fields $D_{field}$.

Figure 3:
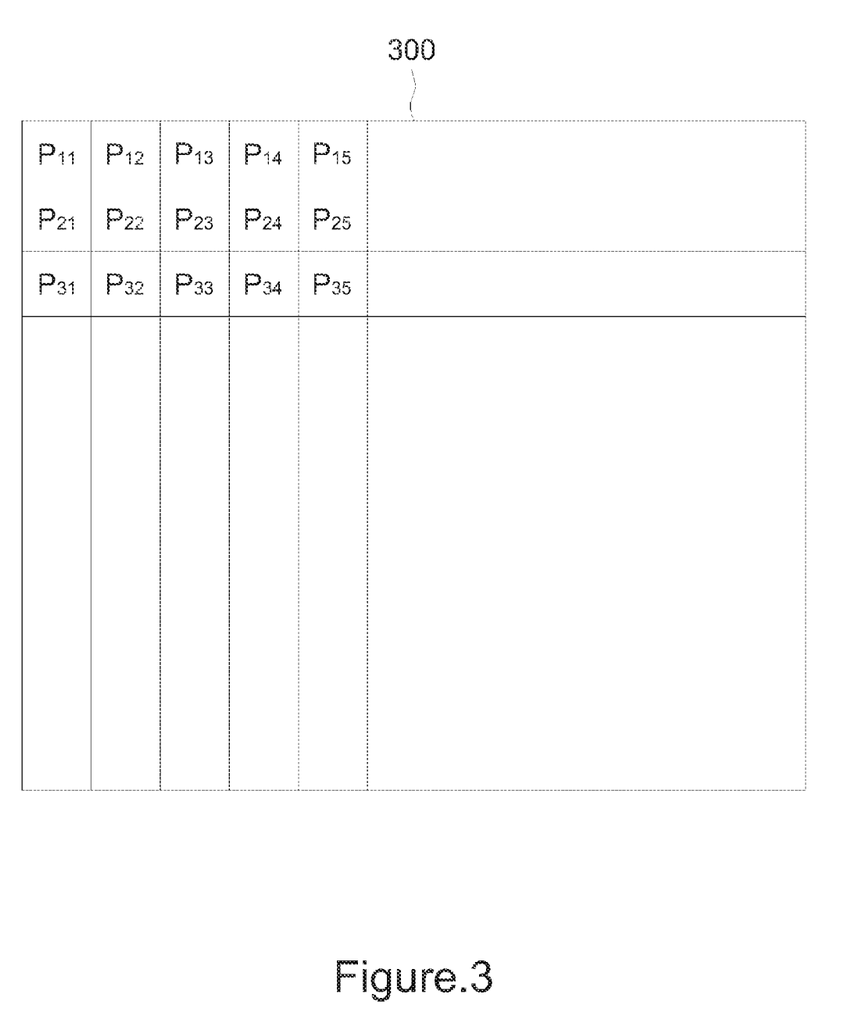
FIG. 3 is a schematic diagram of a field.

FIG. 3 is a schematic diagram of a field 300 comprising luminance values of pixels P11, P12, P13 . . . . In Step 202, taking the field 300 for example, the EKI generating unit 124 calculates an edge intensity value of each pixel of the field 300. Taking a pixel $P_{13}$ for example, an edge intensity value $Y_{13\_e}$ of the pixel $P_{13}$ is obtained by:

$$Y_{13\_e}=|Y_{11}-Y_{12}|+|Y_{12}-Y_{13}|+|Y_{13}-Y_{14}|+|Y_{14}-Y_{15}|;$$

$$Y_{13\_e}=|Y_{11}-Y_{13}|+2*|Y_{12}-Y_{14}|+|Y_{13}-Y_{15}|;$$

$$Y_{13\_e}=|\max(Y_{11}\sim Y_{15})-\min(Y_{11}\sim Y_{15})|;$$

where $Y_{11}$ to $Y_{15}$ are respectively original luminance values of pixels $P_{11}$ to $P_{15}$, $\max(Y_{11}\sim Y_{15})$ is a maximum luminance value among $Y_{11}$ to $Y_{15}$, and min $(Y_{11}\sim Y_{15})$ is a minimum luminance value among $Y_{11}$ to $Y_{15}$. It is to be noted that, other algorithms may also be used for calculating the edge intensity value, and a designer may use different calculation formulas adaptive to his design considerations to generate the edge intensity value of a pixel $P_{xy}$, provided that the edge intensity value of the pixel $P_{xy}$ is determined according to original luminance values of the pixel $P_{xy}$ and at least one neighboring pixel associated with the pixel $P_{xy}$.

In Step 204, taking the pixel $P_{13}$ for example, the noise reducing unit 122 determines two adjustment values $W_1$ and $1-W_1$ according to an edge intensity value $Y_{13\_e}$ generated by the EKI generating unit 124. The adjustment value $W_1$ is determined according to a characteristics curve 400 illustrated in FIG. 4, and the adjustment value $W_1$ is directly proportional to the edge intensity value $Y_{13\_e}$. It is to be noted that, in other embodiments of the present disclosure, the adjustment value $W_1$ may be determined via a lookup table, and these design modifications are within the scope and spirit of the present disclosure.

In Step 206, the noise reducing unit 122 performs a noise reducing calculation on each of the pixels of the field 300 to generate a plurality of first adjusted luminance values corresponding to the pixels. Taking the pixel $P_{13}$ of the field 300 for example, a first adjusted luminance value $Y'_{13}$ of the pixel $P_{13}$ is calculated as:

$$Y'_{13}=a_1*Y_{11}+a_2*Y_{12}+a_3*Y_{13}+a_4*Y_{14}+a_5*Y_{15},$$

where $Y_{11}$, $Y_{12}$, $Y_{13}$, $Y_{14}$ and $Y_{15}$ are original luminance values of the pixels $P_{11}$, $P_{12}$, $P_{13}$, $P_{14}$ and $P_{15}$, and $a_1$, $a_2$, $a_3$, $a_4$ and $a_5$ are constants such as ⅑, 2/9, 3/9, 2/9 and ⅑, respectively. When a first adjusted luminance value $Y_{xy}'$ of a pixel $P_{xy}$ is to be calculated, the noise reducing unit 122 by weighted averaging the pixel $P_{xy}$ to horizontally adjacent pixels to generate the first adjusted luminance value $Y_{xy}'$ of the pixel $P_{xy}$. Accordingly, the noise reducing unit 122 calculates the plurality of first adjusted luminance values $Y_{11}'$, $Y_{12}'$, $Y_{13}'$ . . . of the pixels $P_{11}$, $P_{12}$, $P_{13}$ . . . respectively.

Note that the foregoing formulas for calculating the first adjusted luminance values $Y_{11}'$, $Y_{12}'$, $Y_{13}'$ . . . are described as an example, and other approaches may be applied to other embodiments of the present disclosure to calculate a first adjusted luminance value of each of the pixels. For example, two-dimensional (2D) adjacent pixels are used for adjusting a luminance value of a pixel $P_{22}$ of the field 300, and a first adjusted luminance value $Y_{22}'$ of the pixel $P_{22}$ is calculated as:

$$Y_{22}'=a_{11}*Y_{11}+a_{12}*Y_{12}+a_{13}*Y_{13}+a_{21}*Y_{21}+a_{22}*Y_{22}+a_{23}*Y_{23}+a_{31}*Y_{31}+a_{32}*Y_{32}+a_{33}*Y_{33},$$

where $Y_{11}$ to $Y_{33}$ are original luminance values of pixels $P_{11}$ to $P_{33}$, and $a_{11}$ to $a_{33}$ are constants. In other words, provided that the first adjusted luminance value $Y_{xy}'$ of the pixel $P_{xy}$ is determined according to the pixel $P_{xy}$ and an original luminance value of at least one neighboring pixel associated with the pixel $P_{xy}$, the approach for calculating the first adjusted luminance values $Y_{11}'$, $Y_{12}'$, $Y_{13}'$ . . . can be modified to adapt to considerations of users.

Figure 4:
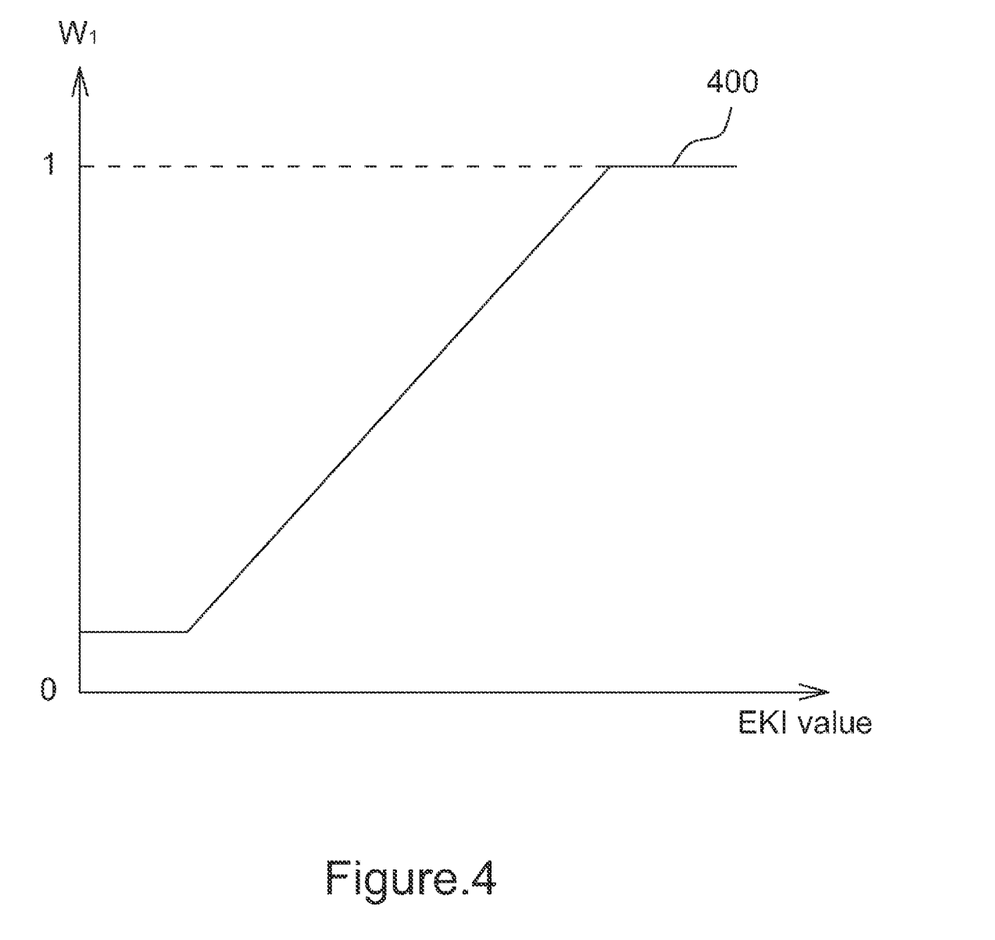
FIG. 4 is a characteristics curve diagram of an original EKI and an adjustment value.

After the plurality of first adjusted luminance values $Y_{11}'$, $Y_{12}'$, $Y_{13}'$ . . . of the pixels $P_{11}$, $P_{12}$, $P_{13}$ . . . are calculated, in Step 208, the noise reducing unit 122 calculates each of the pixels of the field 300 to generate a static adjusted luminance value corresponding to each of the pixels. Taking the pixel $P_{12}$ of the field 300 for example, a static adjusted luminance value $Y_{12\_SNR}$ of the pixel $P_{12}$ is calculated as:

$$Y_{12\_SNR}=W_1*Y_{12}+(1-W_1)*Y'_{12},$$

where $Y_{12}$ and $Y_{12}'$ are respectively an original luminance value and a first adjusted luminance value of the pixel $P_{12}$, and $W_1$ is an adjustment value determined via a characteristics curve 400 illustrated in FIG. 4. In other words, the $Y_{12\_SNR}$ of the pixel $P_{12}$ is obtained through by weight adding the original luminance value $Y_{12}$ of the pixel $P_{12}$ to the first adjusted luminance value $Y'_{12}$. A weight value of the original luminance value $Y_{12}$ is $W_1$, and a weight value of the first adjusted luminance value $Y'_{12}$ is $1-W_1$.

For other pixels of the field 300, the noise reducing unit 122 generates an adjusted image data by similarly implementing the foregoing approach of calculating the static adjusted luminance value $Y_{12\_SNR}$ of the pixel $P_{12}$.

The concept of calculating a static adjusted luminance value of a pixel is briefly described below. Generally, image edges are blurred after noise reducing process is performed, and thus to prevent the undesirable blurred image edges, the noise reducing unit 122 according to an embodiment of the present disclosure determines a proper noise processing level via the edge intensity value $Y_{12\_e}$. For example, when the pixel $P_{12}$ is near an edge, the edge intensity value $Y_{12\_e}$ is quite large such that the adjustment value $W_1$ is also large. Supposing the adjustment value $W_1$ is 0.95, the static adjusted luminance value $Y_{12\_SNR}$ of the pixel $P_{12}$ is calculated as:

$$Y_{12\_SNR}=0.95*Y_{12}+0.05*Y'_{12},$$

That is, less noise processing is performed on the static adjusted luminance value $Y_{12\_SNR}$ of the pixel $P_{12}$ (the static adjusted luminance value $Y_{12\_SNR}$ of the pixel $P_{12}$ approximates the original luminance value $Y_{12}$). On the contrary, when the pixel $P_{12}$ is not near the edge, the edge intensity value $Y_{12\_e}$ is quite small such that the adjustment value $W_1$ is also small. Supposing that the adjustment value $W_1$ is 0.1, the static adjusted luminance value $Y_{12\_SNR}$ of the pixel $P_{12}$ is calculated as:

$$Y_{12\_SNR}=0.1*Y_{12}+0.9*Y'_{12}$$

That is, more noise processing is performed on the static adjusted luminance value $Y_{12\_SNR}$ of the pixel $P_{12}$ (the static adjusted luminance value $Y_{12\_SNR}$ of the pixel $P_{12}$ approximates the first adjusted luminance value $Y'_{12}$). Therefore, the image processing apparatus 100 performs more noise processing on a pixel that is not near an edge, and performs less noise processing on a pixel that is near an edge, so as to avoid the blur of the image edges. Therefore, according to the present disclosure, an optimal noise processing effect is achieved without excessively blurring the image edges.

After the noise reducing unit 122 generates a plurality of adjusted fields $D_{SNR}$ corresponding pixels of a plurality of fields $D_{field}$ (not shown), with a luminance value of each of the plurality of adjusted fields $D_{SNR}$ being the foregoing static adjusted luminance value, the noise reducing unit 122 performs a dynamic noise reducing process on the plurality of adjusted fields $D_{SNR}$ to further improve image quality. An operation flow of performing a dynamic noise reducing by the noise reducing unit 122 is described below.

In Step 210, the EKI generating unit 124 sums up edge intensity values $Y_{11\_e}$, $Y_{12\_e}$, $Y_{12\_e}$ ... of the plurality of pixels (or pixels of a whole image), to generate an original $EKI_o$:

$$EKI_o=Sum(Y_{11\_e},Y_{12\_e},Y_{13\_e}...).$$

The EKI generating unit 124 generates a first $EKI_1$ and a dynamic noise-reduced $EKI_{DNR}$ by implementing the calculation approach similar to that of the original $EKI_o$. However, original luminance values of the pixels are used for calculating the original $EKI_o$, first adjusted luminance values of pixels are used for calculating the first $EKI_1$, and dynamic adjusted luminance values of pixels are used for calculating the dynamic noise-reduced $EKI_{DNR}$. Taking the first $EKI_1$ for example, a first edge intensity value $Y'_{13\_1\_e}$ is calculated as:

$$Y'_{13\_1\_e}=|Y'_{11\_1}-Y'_{12\_1}|+|Y'_{12\_1}-Y'_{13\_1}|+|Y'_{13\_1}-Y'_{14\_1}|+|Y'_{14\_1}-Y'_{15\_1}|,$$

where $Y'_{11\_1}$ to $Y'_{15\_1}$ are first luminance values of the pixels $P_{11}$ to $P_{15}$ at a field $F_{0\_even}$. After calculating the first edge intensity values $Y'_{11\_1\_e}$, $Y'_{12\_1\_e}$, $Y'_{13\_1\_e}$ ... of the pixels $P_{11}$, $P_{12}$, $P_{13}$ ..., the EKI generating unit 124 sums up the first edge intensity values $Y'_{11\_1\_e}$, $Y'_{12\_1\_e}$, $Y'_{13\_1\_e}$ ... of the plurality of pixels (or pixels of a whole image) to generate the first $EKI_1$ represented as:

$$EKI_1=SUM(Y'_{11\_1\_e},Y'_{12\_1\_e},Y'_{13\_1\_e}...).$$

In addition, the calculation approach for calculating the dynamic noise-reduced $EKI_{DNR}$ can be deduced from the foregoing description, and details shall not be described for brevity.

It is to be noted that, the step of calculating the original $EKI_o$, the first $EKI_1$ and the dynamic noise-reduced $EKI_{DNR}$ may be interleaved between Step 208 and Step 210 or be performed at other proper time points. In addition, the original $EKI_o$, the first $EKI_1$ and the dynamic noise-reduced $EKI_{DNR}$ may be calculated at different time points.

Figure 5:
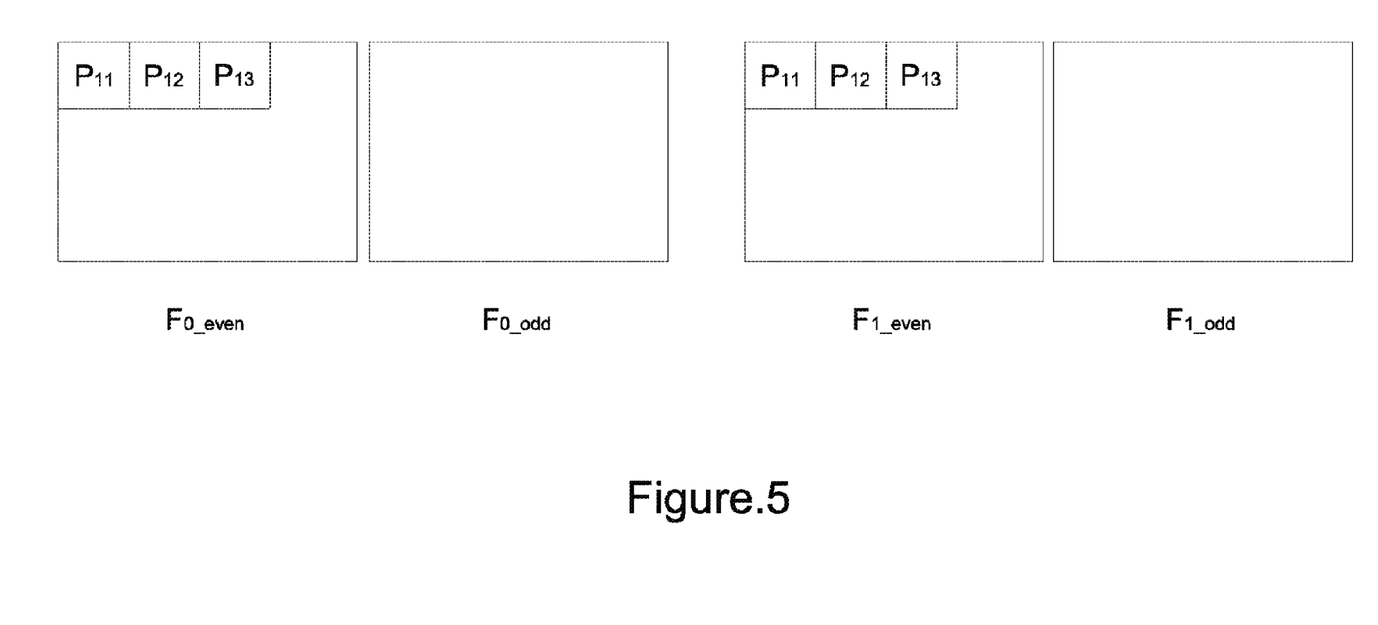
FIG. 5 is a schematic diagram of a plurality of fields.

FIG. 5 is a schematic diagram of a plurality of fields $D_{field}$ comprising $F_{0\_even}$, $F_{0\_odd}$, $F_{1\_even}$ and $F_{1\_odd}$. $F_{0\_even}$ is an even field of a previous field, $F_{0\_odd}$ is an odd field of the previous field, $F_{1\_even}$ is an even field of a current field, and $F_{1\_odd}$ is an odd field of the current field. In addition, $F_{0\_even}$ and $F_{1\_even}$ have pixels at same positions of an image; that is, pixels $P_{11}$, $P_{12}$ and $P_{13}$, of $F_{0\_even}$ and $F_{1\_even}$, illustrated in FIG. 5 are at the same positions of the image.

Figure 6:
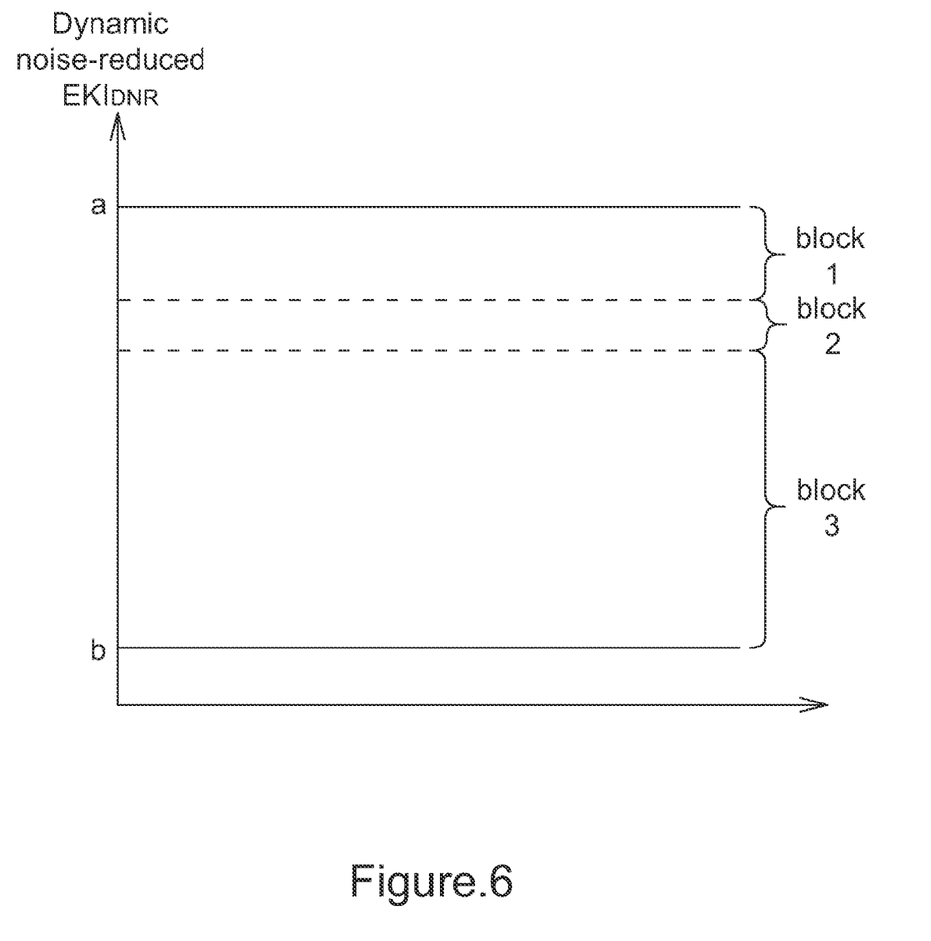
FIG. 6 is a schematic diagram of a plurality of blocks of a dynamic noise-reduced $EKI_{DNR}$.

Referring to FIG. 1, FIG. 2 and FIG. 5, in Step 206 illustrated in FIG. 2, suppose that the noise reducing unit 122 performs dynamic noise reducing with respect to the adjusted field $F_{1\_even}$. Take the pixel $P_{12}$ illustrated in FIG. 5 for example. Supposing that the noise reducing unit 122 determines an adjustment value $W_2$ of the current field $F_{1\_even}$ according to the original $EKI_o$, the first $EKI_1$ and the dynamic noise-reduced $EKI_{DNR}$ of the even field $F_{0\_even}$ (or the odd field $F_{0\_odd}$) prior to the current field $F_{1\_even}$. In Step 212, the noise reducing unit 122 determines the adjustment value $W_2$ of the field $F_{1\_even}$ according to which block illustrated in FIG. 6 the dynamic noise-reduced $EKI_{DNR}$ of the even field $F_{0\_even}$ prior to the current field $F_{1\_even}$ lies in. More particularly, an upper boundary a illustrated in FIG. 6 is the original $EKI_o$ of the field $F_{0\_even}$, and a lower boundary b is the first $EKI_1$. When the dynamic noise-reduced $EKI_{DNR}$ lies in block 2, the adjustment value $W_2$ is equal to 1; when the dynamic noise-reduced $EKI_{DNR}$ lies in block 3, the adjustment value $W_2$ is greater than 1. Note that the number of blocks is described for illustration purposes only; that is, the number and ranges of the blocks and the adjustment value $W_2$ corresponding to the blocks may be modified to adapt to various design considerations. In addition, the adjustment value $W_2$ may be determined via a lookup table according to the dynamic noise-reduced $EKI_{DNR}$, and the design modifications are within the scope and spirit of the present disclosure.

In Step 214, taking the pixel $P_{12}$ of the field $F_{1\_even}$ for example, the noise reducing unit 122 determines a dynamic adjusted luminance value $Y_{1\_12\_DNR}$ of the pixel $P_{12}$ according to the original luminance value $Y_{1\_12}$ of the pixel $P_{12}$, the first adjusted luminance value $Y'_{1\_12}$, the adjustment value $W_1$ and the adjustment value $W_2$. The dynamic adjusted luminance value $Y_{1\_12\_DNR}$ of the pixel $P_{12}$ at the current field $F_{1\_even}$ is calculated as:

$$Y_{1\_12\_DNR}=W_3*Y_{1\_12}+(1-W_3)*Y'_{1\_12},$$

where the adjustment value $W_3$ is equal to $W_i*W_2$.

After that, the image adjusting unit 120 performs the foregoing calculation on all pixels of the field $D_{field}$ to generate a plurality of noise-reduced fields $D_{field}'$ to the de-interlacing unit 130.

In Step 216, the de-interlacing unit 130 de-interlaces the plurality of dynamic noise-reduced fields $D_{field}'$ to generate a plurality of frames $D_{frame}$. In Step 218, the image scaling unit 140 scales the plurality of frame $D_{frame}$ to generate a plurality of display data $D_{out}$ to a display.

It is to be noted that, in another embodiment illustrated in FIG. 1, the image adjusting unit 120 need not perform the dynamic noise processing; that is, the adjusted field $D_{SNR}$ outputted by the dynamic noise reducing unit 122 may also be directly outputted by the image adjusting unit 120, and is then de-interlaced by the de-interlacing unit 130 to generate the plurality of frames $D_{frame}$—such design modifications are within the scope and spirit of the present disclosure.

Figure 7:
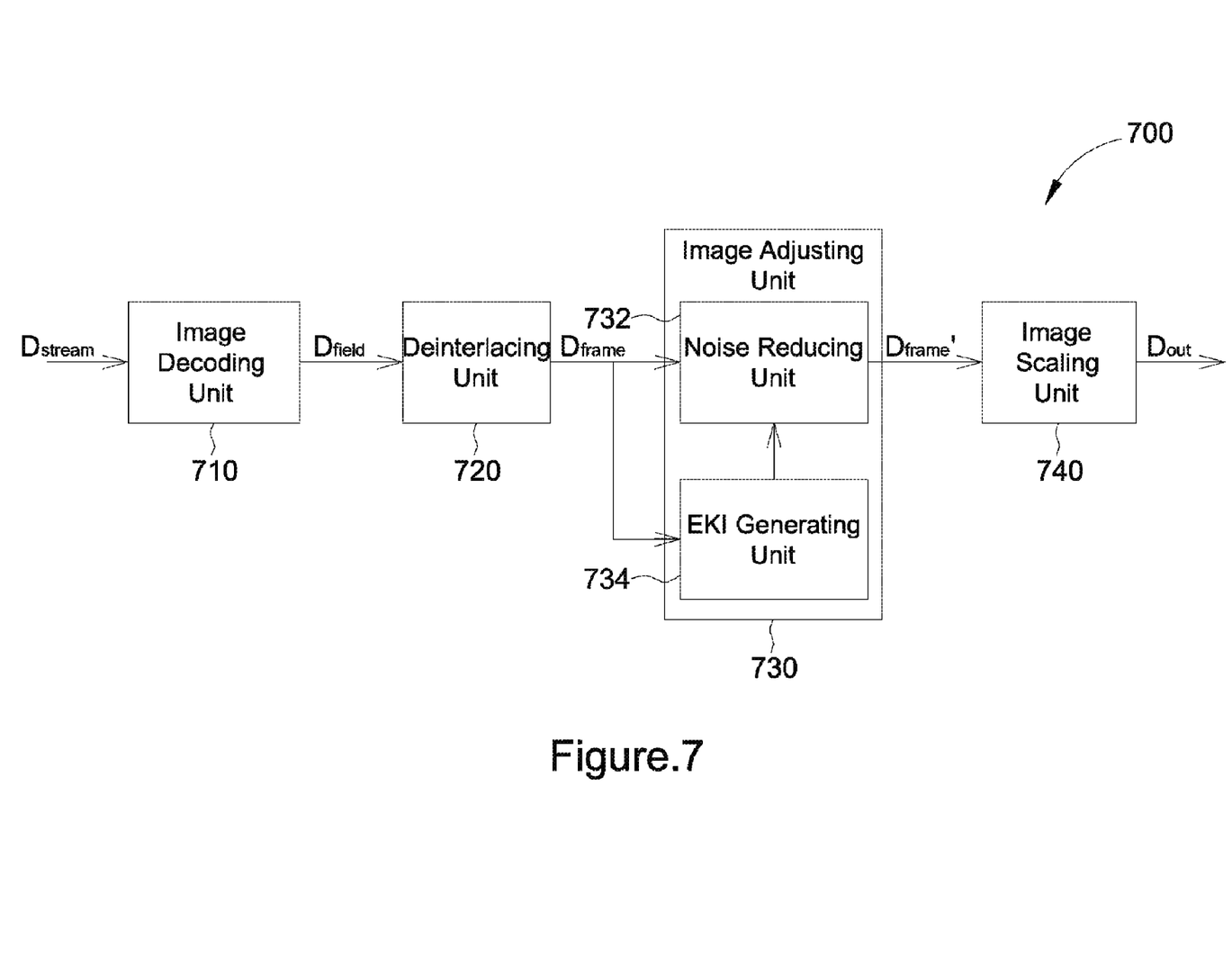
FIG. 7 is a schematic diagram of an image processing apparatus in accordance with a second embodiment of the present disclosure.

FIG. 7 is a schematic diagram of an image processing apparatus 700 in accordance with a second embodiment of the present disclosure. The image processing apparatus 700 comprises an image decoding unit 710, a de-interlacing unit 720, an image adjusting unit 730 and an image scaling unit 740. The image adjusting unit 730 comprises a noise reducing unit 732 and an EKI generating unit 734. In addition, the image processing apparatus 700 is implemented via a hardware or software approach.

A difference between the image processing apparatus 700 and the image processing apparatus 100 illustrated in FIG. 1 is that the image adjusting unit 120 of the image processing apparatus 100 adjusts field and the image adjusting unit 730 of the image processing apparatus 700 adjusts frame. In addition, operations of the image adjusting unit 730 are similar to those of the image adjusting unit 120. Therefore, the operation flow of the image processing apparatus 700 is easily deduced by a person having ordinary skill in the art after reading the description associated with the image processing apparatus 100, and details thereof shall not be described for brevity.

Figure 8:
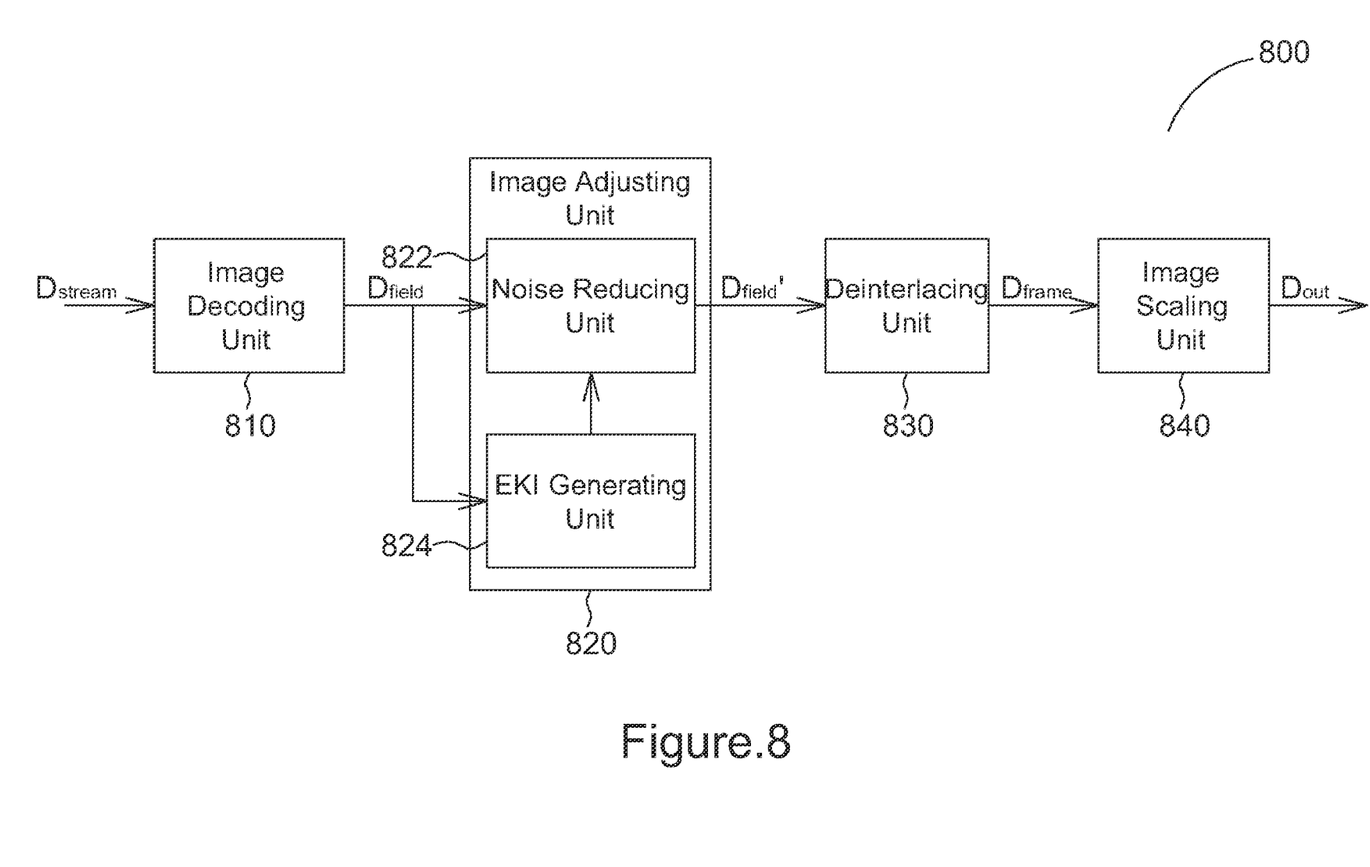
FIG. 8 is a schematic diagram of an image processing apparatus in accordance with a third embodiment of the present disclosure.

FIG. 8 is a schematic diagram of an image processing apparatus 800 in accordance with a third embodiment of the present disclosure. The image processing apparatus 800 comprises an image decoding unit 810, an image adjusting unit 820, a de-interlacing unit 830 and an image scaling unit 840. The image adjusting unit 820 comprises a noise reducing unit 822 and an EKI generating unit 824. In addition, the image processing apparatus is implemented via a hardware or software approach.

Figure 9:
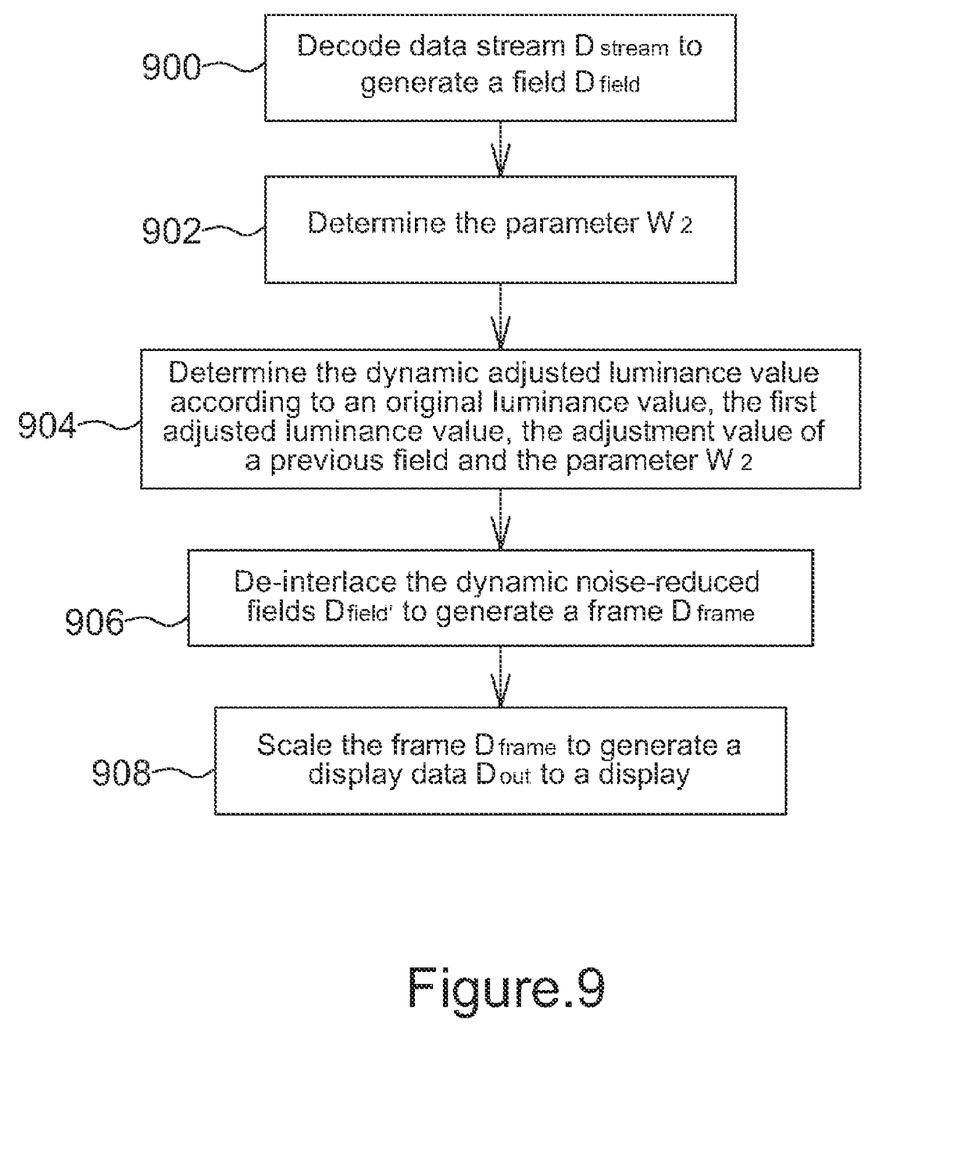
FIG. 9 is a flowchart of processing a data stream by an image processing apparatus illustrated in FIG. 8.

Referring to FIG. 8 and FIG. 9, FIG. 9 is a flowchart of performing image processing on a data stream $D_{stream}$ by the image processing apparatus 800. Note that, the steps in the flowchart need not be performed as the sequence shown in FIG. 9 nor be successive, provided that the same result is substantially achieved. In Step 900, an image decoding unit 810 decodes the data stream $D_{steam}$ to generate the plurality of fields $D_{field}$ illustrated in FIG. 5.

In Step 902, referring to FIG. 5, FIG. 8 and FIG. 9, suppose that the image adjusting unit 820 adjusts the field $F_{1\_even}$. Taking the pixel $P_{12}$ illustrated in FIG. 5 for example, suppose that the dynamic adjusted luminance value $Y_{0\_12\_DNR}$ of the pixel $P_{12}$ at the previous field $F_{0\_even}$ prior to the current filed data $F_{1\_even}$ is calculated as:

$$Y_{0\_10\_DNR}=W_{0\_3}*Y_{0\_12}+(1-W_{0\_3})*Y'_{0\_12},$$

where $Y_{0\_12}$ is an original luminance value of the pixel $P_{12}$ at the previous field $F_{0\_even}$, $Y'_{0\_12}$ is a first adjusted luminance value of the pixel $P_{12}$ at the previous field $F_{0\_even}$, and $W_{0\_3}$ is an adjustment value. The noise reducing unit 822 first determines a parameter $W_2$ of the current filed data $F_{1\_even}$ according to an original $EKI_O$, a first $EKI_1$ and a dynamic noise-reduced $EKI_{DNR}$. Note that, the calculation approach of calculating the original $EKI_o$, the first $EKI_1$ and the dynamic noise-reduced $EKI_{DNR}$ is described in detail in the embodiment with reference to FIG. 1, and the method for determining the parameter $W_2$ is similar to Step 212 illustrated in FIG. 2 (referring to FIG. 6, the parameter $W_2$ is the adjustment value $W_2$ in accordance with the embodiment illustrated in FIG. 1), so that details shall not be described for brevity.

In Step 904, taking the pixel $P_{12}$ at the current field $F_{1\_even}$ for example, the noise reducing unit 822 determines the dynamic adjusted luminance value $Y_{1\_12\_DNR}$ of the pixel $P_{12}$ according to an original luminance value $Y_{1\_12}$ of the pixel $P_{12}$ at the current field $F_{1\_even}$, the first adjusted luminance value $Y'_{1\_12}$, the adjustment value $W_{0\_3}$ of a previous field and the parameter $W_2$. The dynamic adjusted luminance value $Y_{1\_12\_DNR}$ of the pixel $P_{12}$ at the current field $F_{1\_even}$ is calculated as:

$$Y_{1\_12\_DNR}=W_{1\_3}*Y_{1\_12}+(1-W_{1\_3})*Y'_{1\_12},$$

where the adjustment value $W_{1\_3}$ is equal to $W_{0\_3}*W_2$. More particularly, the adjustment value $W_{1\_3}$ of a current field is generated via a recursive calculation, which applies the parameter $W_2$ to adjust an adjustment value $W_{0\_3}$ of the previous field. The parameter $W_2$ is determined according to a distribution of the original $EKI_0$ of the previous even field $F_{0\_even}$, the first $EKI_1$ and the dynamic noise-reduced $EKI_{DNR}$. The adjustment value $W_{0\_3}$ is generated by adjusting a previous adjustment value, and the approach is the same as that for obtaining the adjustment value $W_{1\_3}$, so that details shall not be described for brevity.

The image adjusting unit 820 performs the foregoing calculation on all pixels to generate a plurality of adjusted fields $D_{field}'$ to be transmitted to the de-interlacing unit 830.

In Step 906, the de-interlacing unit 830 de-interlaces the plurality of dynamic noise-reduced fields $D_{field}'$ to generate a plurality of frames $D_{frame}$. In Step 908, the image scaling unit 840 scales the plurality of frames $D_{frame}$ to generate a plurality of display data $D_{out}$ to be transmitted to a display.

Figure 10:
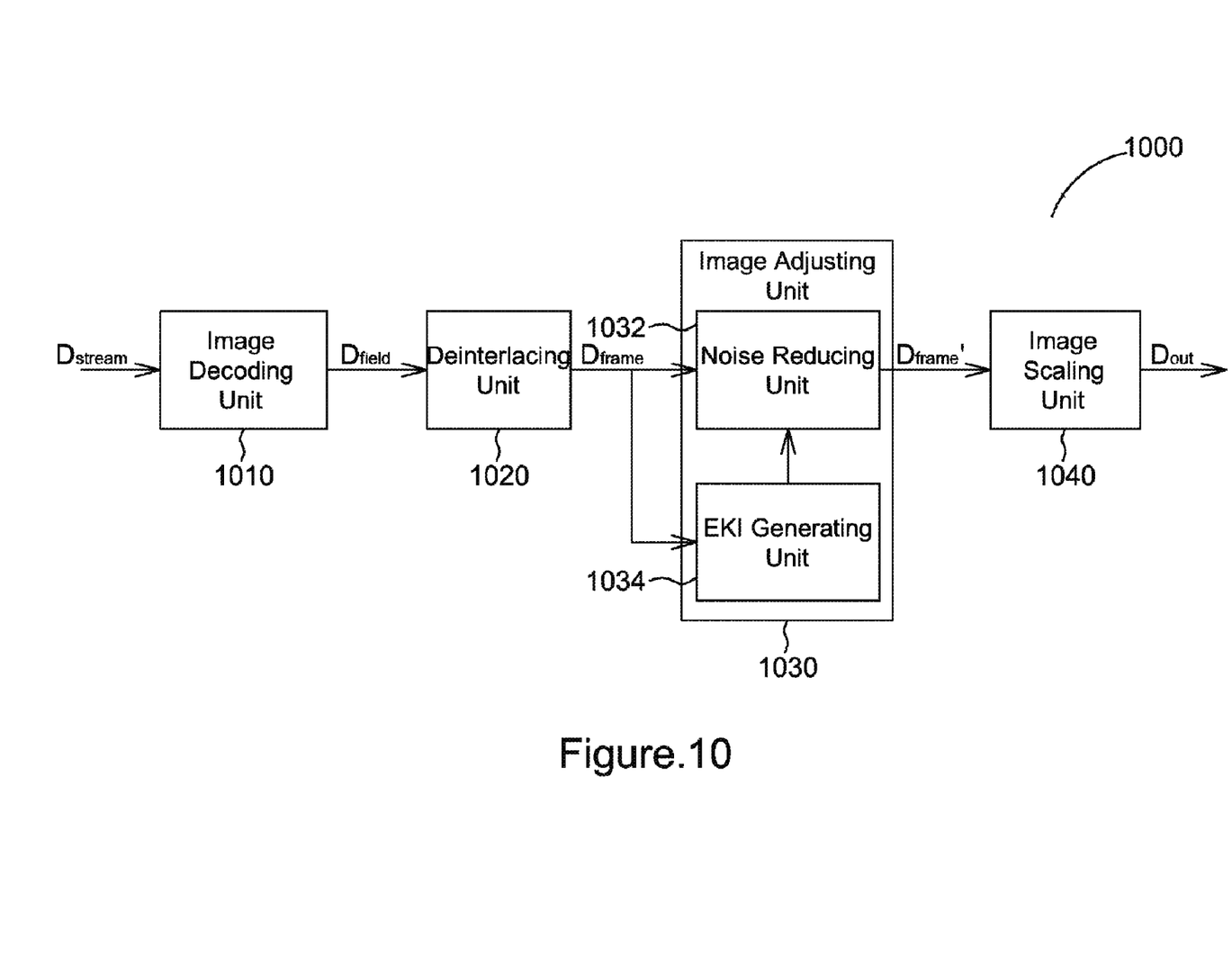
FIG. 10 is a schematic diagram of an image processing apparatus in accordance with a fourth embodiment of the present disclosure.

FIG. 10 is a schematic diagram of an image processing apparatus 1000 in accordance with a fourth embodiment of the present disclosure. The image processing apparatus 1000 comprises an image decoding unit 1010, a de-interlacing unit 1020, an image adjusting unit 1030 and an image scaling unit 1040. The image adjusting unit 1030 comprises a noise reducing unit 1032 and an EKI generating unit 1034. In addition, the image processing apparatus 1000 is implemented via a hardware or software approach.

A difference between the image processing apparatus 1000 and the image processing apparatus 800 illustrated in FIG. 8 is that the image adjusting unit 820 of the image processing apparatus 800 adjusts field and the image adjusting unit 1030 of the image processing apparatus 1000 adjusts frame. Other than that, operations of the image adjusting unit 1030 are similar to those of the image adjusting unit 820. Therefore, the operation flow of the image processing apparatus 1000 is easily deduced by a person having ordinary skill in the art after reading the description associated with the image processing apparatus 800, and details thereof shall not be described for brevity.

In conclusion, according to an image processing apparatus and an image processing method in accordance with an embodiment of the present disclosure, a noise processing level of a pixel data of an image is determined according to an EKI of the pixel. Accordingly, noise processing with a proper level is performed on the pixel data of the image to improve image quality.

While the disclosure has been described in terms of what is presently considered to be the most practical and preferred embodiments, it is to be understood that the present disclosure needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. An image processing apparatus for adjusting luminance of a target pixel, the apparatus comprising:
   an image decoding unit, that decodes a data stream to generate a plurality of images comprising a current image having the target pixel; and
   an adjusting unit, coupled to the image decoding unit, comprising:
   an edge keeping index (EKI) generating unit, that generates an edge intensity value for the target pixel according to an original luminance value of the target pixel and an original luminance value of at least one neighboring pixel associated with the target pixel; and
   a noise reducing unit, coupled to the EKI generating unit, that determines a first adjusted luminance value of the target pixel according to the original luminance value of the target pixel and the original luminance value of the at least one neighboring pixel associated with the target pixel, and that generates a static adjusted luminance value of the target pixel according to the original luminance value, the first adjusted luminance value, and a first adjustment value of the target pixel, the adjustment value being determined according to the edge intensity value.

2. The image processing apparatus as claimed in claim 1, wherein the EKI generating unit generates the edge intensity value of the target pixel by calculating a difference between the original luminance value of the target pixel and the original luminance value of the at least one neighboring pixel associated with the target pixel.

3. The image processing apparatus as claimed in claim 1, wherein the noise reducing unit generates the first adjusted luminance value of the target pixel by weighted averaging the original luminance value of the target pixel and the original luminance value of the at least one neighboring pixel associated with the target pixel according to the adjustment value of the target pixel.

4. The image processing apparatus as claimed in claim 1, wherein the first adjustment value is directly proportional to the edge intensity value.

5. The image processing apparatus as claimed in claim 1, wherein the plurality of image further comprise a previous image having a corresponding pixel mapped to the target pixel of the current image, and wherein the noise reducing unit further determines a second adjustment value of the target pixel according to an original EKI, a first EKI and a dynamic noise-reduced EKI of the corresponding pixel, and further determines a dynamic adjusted luminance value of the target pixel according to the original luminance value, the first adjusted luminance value, and the second adjustment value of the target pixel.

6. The image processing apparatus as claimed in claim 5, wherein the noise reducing unit generates the dynamic adjusted luminance value of the target pixel by weighted averaging the original luminance value and the first adjusted luminance value of the target pixel according to the first adjustment value and the second adjustment value.

7. The image processing apparatus as claimed in claim 5, wherein the noise reducing unit determines a third adjustment value according to the first adjustment value and the second adjustment value, and further generates the dynamic adjusted luminance value by weighted averaging the original luminance value and the first adjusted luminance value of the target pixel according to the third adjustment value.

8. An apparatus capable of adjusting luminance of a target pixel, the apparatus comprising:
a processor configured to perform operations comprising:
decoding a data stream to generate a plurality of images comprising a current image having the target pixel;
determining an edge intensity value of the target pixel according to an original luminance value of the target pixel and an original luminance value of at least one neighboring pixel associated with the target pixel;
generating a first adjusted luminance value of the target pixel according to the original luminance value of the target pixel and the original luminance value of the at least one neighboring pixel associated with the target pixel; and
determining a static adjusted luminance value of the target pixel according to the original luminance value, the first adjusted luminance value, and a first adjustment value, the first adjustment value being determined according to the edge intensity value.

9. The apparatus as claimed in claim 8, wherein the format of the plurality of image is one of field and frame.

10. The apparatus as claimed in claim 8, wherein the edge intensity value is obtained by calculating a difference between the original luminance value of the target pixel and the original luminance value of the at least one neighboring pixel associated with the target pixel.

11. The apparatus as claimed in claim 8, wherein the first adjustment value is generated by weighted averaging the original luminance value of the target pixel and the original luminance value of the at least one neighboring pixel associated with the target pixel.

12. The apparatus as claimed in claim 8, wherein the first adjustment value is directly proportional to the edge intensity value.

13. The apparatus as claimed in claim 8, the plurality of image data further comprising a previous image having a corresponding pixel mapped to the target pixel of the current image, the processor further configured to perform operations comprising:
determining a second adjustment value of the target pixel according to an original EKI, a first EKI and a dynamic noise-reduced EKI of the corresponding pixel; and
determining a dynamic adjusted luminance value of the target pixel according to the original luminance value, the first adjusted luminance value, and the second adjustment value of the target pixel.

14. The apparatus as claimed in claim 13, wherein the dynamic adjusted luminance value is generated by weighted averaging the original luminance value and the first adjusted luminance value of the target pixel.

15. An image processing apparatus for adjusting the luminance of a target pixel, the apparatus comprising:
an image decoding unit, that decodes a data stream to generate a plurality of images comprising a current image having the target pixel and a previous image having a corresponding pixel mapped to the target pixel; and
an image adjusting unit, coupled to the image decoding unit, comprising:
an EKI generating unit, that generates an original EKI, a first EKI, and a dynamic noise-reduced EKI of the corresponding pixel according to an original luminance value, a first adjustment value, and a dynamic adjusted luminance value of the corresponding pixel; and
a noise reducing unit, coupled to the EKI generating unit, that determines a first adjusted luminance value of the target pixel according to an original luminance value of the target pixel and an original luminance value of at least one neighboring pixel associated with the target pixel, and that generates a dynamic adjusted luminance value of the target pixel according to the original luminance value, the first adjusted luminance value, and an adjustment value of the target pixel, the adjustment value of the target pixel being obtained by adjusting an adjustment value of the corresponding pixel according to a parameter determined according to the original EKI, the first EKI, and the dynamic noise-reduced EKI of the corresponding pixel.

16. The image processing apparatus as claimed in claim 15, wherein the noise reducing unit generates the dynamic adjusted luminance value of the target pixel by weighted averaging the original luminance value and the first adjusted luminance value of the target pixel.

17. The image processing apparatus as claimed in claim 16, wherein the noise reducing unit determines the adjustment value of the target pixel according to the parameter and the adjustment value of the corresponding pixel, and generates the dynamic adjusted luminance value by weighted averaging the original luminance value and the first adjusted luminance value of the target pixel according to the adjustment value.

* * * * *